United States Patent [19]

Harwig et al.

[11] Patent Number: 5,624,067
[45] Date of Patent: Apr. 29, 1997

[54] METHOD AND APPARATUS FOR WELD JOINING PIPE SECTIONS

[75] Inventors: Dennis D. Harwig; John M. Sanders, both of Canton; Stephen W. Manring, Alliance, all of Ohio

[73] Assignee: The Babcock & Wilcox Company, New Orleans, La.

[21] Appl. No.: 533,896

[22] Filed: Sep. 26, 1995

[51] Int. Cl.⁶ ............................................. B23K 37/06
[52] U.S. Cl. ............................................. 228/216; 228/50
[58] Field of Search ................... 228/50, 44.5, 49.3, 228/216; 219/60 A, 61, 137 R

[56] References Cited

U.S. PATENT DOCUMENTS

| | | |
|---|---|---|
| 3,570,109 | 3/1971 | Harlan et al. ............................ 228/50 |
| 3,696,228 | 10/1972 | Thomas, Jr. et al. .................... 219/76 |
| 3,960,311 | 6/1976 | Griffiths ................................. 228/50 |
| 4,465,220 | 8/1984 | Ledlow et al. .......................... 228/50 |
| 4,775,092 | 10/1988 | Edmonds et al. ...................... 228/222 |
| 4,782,206 | 11/1988 | Ayres et al. ......................... 219/76.14 |
| 4,842,186 | 6/1989 | Doyle et al. ........................... 228/222 |
| 4,894,505 | 1/1990 | Malone et al. ...................... 219/76.11 |

FOREIGN PATENT DOCUMENTS

| | | | |
|---|---|---|---|
| 215588 | 6/1956 | Australia ............................. 228/50 |
| 190797 | 11/1982 | Japan ................................. 228/50 |
| 361052 | 1/1973 | U.S.S.R. ............................ 228/50 |
| 732112 | 5/1980 | U.S.S.R. ............................ 228/50 |

Primary Examiner—Samuel M. Heinrich
Attorney, Agent, or Firm—Daniel S. Kalka; Robert J. Edwards

[57] ABSTRACT

A method and apparatus for groove weld joining pipe sections along a rotating preform having a circumferential groove thereon along which the preformed adjoining pipe sections are located to form a weld in the joining area and a underbead in the groove of the preform to thus weld together the pipe sections.

8 Claims, 1 Drawing Sheet

METHOD AND APPARATUS FOR WELD JOINING PIPE SECTIONS

BACKGROUND OF THE INVENTION

1. Field of the Invention

The present invention relates in general to an apparatus and method of weld joining pipe sections and in particular to groove weld joining of such pipe sections.

2. Description of the Related Art

It is known that in pipe segment welding supports of the molten weld underbead can enhance the pipe surface contour during solidification of the weld. Previous efforts to accomplish this have included solid copper back-up shoes which contact the entire inside surface of the pipe adjacent to the weld zone. These solid copper back-ups must fit tightly and for tubular or circular parts such as pipe sections must be built in sections which expand once inserted into the pipe point workpiece. Other methods which have been used include nonmetallic back-ups such as chemically inactive ceramic or even submerged are welding flux. Nonmetallic backing tend to be expensive or cumbersome to apply.

Prior art pipe section joining apparatus suffered from two major problems in welding pipe sections together. These problems involved installing and removing the underbead support tooling and the creation of weld defects. While copper back-up tooling has been used for years in piping welding it has always been configured as pieces of a pie which expanded out to contact the pipe surface during welding. As such there were always gaps between the segments which caused weld defects as the weld metal was unsupported across these gaps in the tooling. These pie segments then had to be retracted after welding in order to clear the underbead. This required extensive and expensive mechanical systems.

In cases where the copper back ups were not used because of the prohibitive cost of the complicated back-up systems, underbeads of the pipe welds had to be hand ground to a finished form involving great expense. Thus, a new apparatus and method for welding joining pipe sections was needed which would be inexpensive and which could be mounted simply as off a cantilevered boom.

SUMMARY OF THE INVENTION

The present invention provides a method and apparatus for groove welding pipe sections together by controlling the shape of the weld underbead by providing a support for the molten metal unit it solidifies. This is done by providing a rotating preform wheel in contact with the backside of the pipe workpiece which is the joining section of the pipe segments. The wheel is made from any metallic material or high temperature ceramic. Copper is the preferred material. Water cooling of the preform wheel may be utilized to minimize contamination of the underbead and promote weld metal mechanical properties such as strength.

For welding the tubular pipe segments together the rotating copper wheel is made smaller in diameter than the pipe segments and can be easily removed and installed in the pipe segments and aligned with the surface to be joined. The described underbead back-up is compatible with any arc welding process such as grove welding and any base material used in known welding processes.

An inert gas shield of known construction could be added to provide protective shielding for forming the molten underbead.

In view of the foregoing it will be seen that one aspect of the present invention is to provide a pipe segment welding apparatus that is easily installable and removable from the inside of pipe segments to be welded.

Another aspect of the present invention is to provide welding apparatus for pipe segment weld joining which won't form weld defects at the underbead.

Yet another aspect of the present invention is to provide a simple groove welding technique for weld joining pipe segments.

These and other aspects of the present invention will be more fully understood after considering the following description of the preferred embodiment in conjunction with the accompanying drawing.

DESCRIPTION OF THE PREFERRED EMBODIMENT

Figure 1:
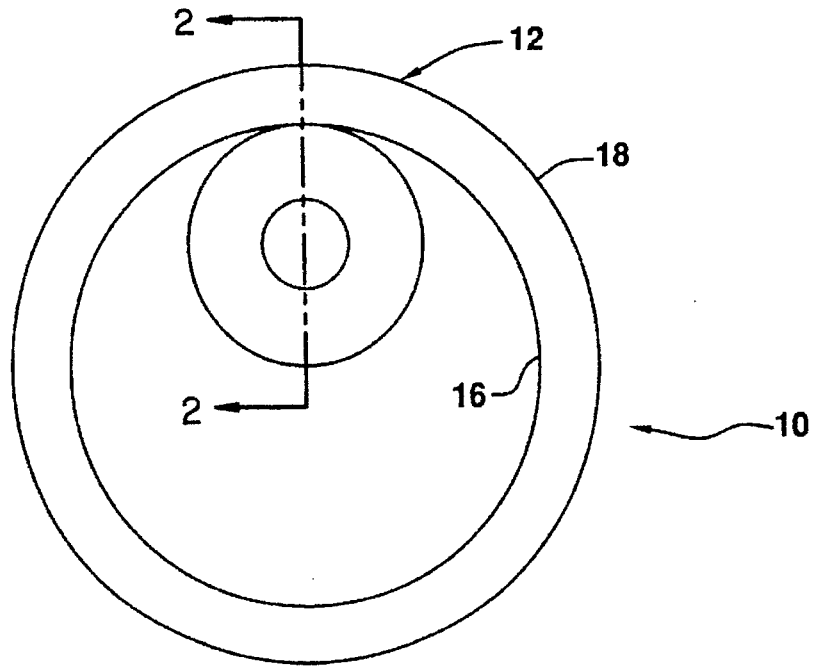
FIG. 1 is an end view of the rotating preform of the present invention located within the pipe sections to be groove welded together.
Figure 2:
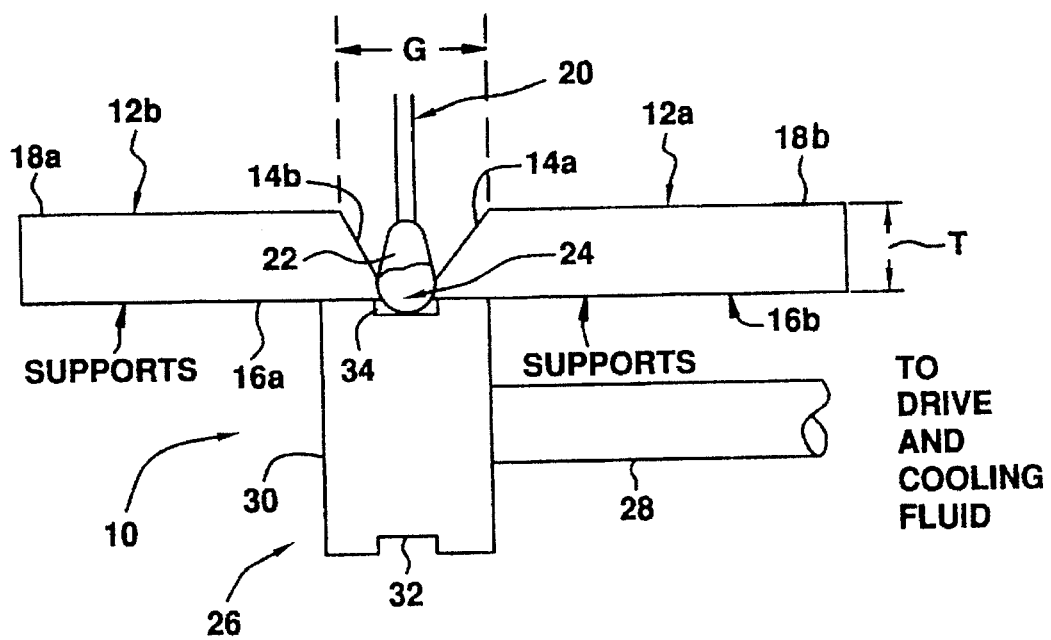
FIG. 2 is a side view taken along section A—A of the FIG. 1 rotating preform.

Referring now to the drawings, FIGS. 1 and 2 show groove welding apparatus 10 for joining two pipe sections 12(a); 12(b) by a unique groove welding technique and apparatus. Groove welding refers to the type of joint preparation applied to the workpiece, in this particular case the pipe sections 12. Standard welding terminology refers to a groove weld as one in which the workpiece is grooved out to facilitate penetration to the root of the joint. Thus as shown in FIG. 2, the pipe sections 12 (a) and 12(b) have been angled along their thickness "T" by known techniques to provide angled ends 14(a) and 14(b) to meet at a point along the tube 12 inside surfaces 16(a) and 16(b) while leaving a gap "G" at the outside surfaces 18(a) and 18(b) to thus form the mentioned groove in the present workpiece.

A welding torch assembly 20 of known design for such applications is allowed to partially enter the groove formed by the gap G between the pipe sections 12(a) and 12(b) to establish a welding arc 22 which forms a molten weld bead 24 at the bottom of the gap G from a welding rod assembly (not shown) feeding weld rod into the groove proximate to the torch assembly 20.

The pipe sections 12(a) and 12(b) are respectively supported in their abutting location by known support assembly and have a rotating preform assembly 26 located along the gap G inside the pipes 12. The assembly 26 is rotated by a shaft 28 connected to a controlled drive motor (not shown). Cooling fluid is provided to the inside of the rotating preform to cool assembly 26. The preform assembly 26 has a round wheel 30 with a grooved portion 32 resting against the abutting inside surfaces 16(a) and 16(b) of the pipe segments 12 to allow an underbead 34 to be formed from the molten weld bead 24 along the inside of the pipe segments 12. Since the rotating preform assembly 26 is held against only the area where the underbead 34 is forming it thus can be made considerably smaller than the pipe segment 12 inside diameter allowing assembly 26 to be inserted and removed from the pipe segment 12 internal surfaces very easily without requiring expensive mechanical systems. Since there are no gaps between the segments, weld defects aren't formed. In actual use the assembly 10 has been found to be surprisingly tolerant to location. It doesn't have to be located precisely to work. This is a major advantage when compared to previously designed systems for pipe segment welding.

The rotating preform assembly 26 could be made from several types of materials. Metallic, ceramic, or amalgamation of both would be acceptable. Also, groove 34 shapes can be varied to change underbead shape according to the most effective size and form whenever additional reinforcement is desired from the underbead.

From the foregoing it will be seen that the present invention provides various advantages over the prior art techniques and apparatus for weld joining pipe segments. As an example:

The device can be used for a variety of configurations without modifications. Solid copper back-ups previously used would closely have to match the radius of the part being used. The rotating preform has the advantage of being equally useful for longitudinal nd circumferential welding without modification.

The device can easily be installed and removed due to it being smaller in diameter than the workpiece.

The device is significantly less expensive than commercially available ceramic backings which are only good for one weld before they must be replaced.

The device doesn't produce gaps in support found in the segmented back-up shoes of prior art devices which must be collapsed for removal.

By use of water cooling the preform can be matched to the base material which will eliminate the concern for contamination.

Installation time is reduced over all other methods by use of known retaining devices using simple spring pressure to hold the preform against the workpiece in the weld area.

Tooling complexity is greatly reduced for weld joints which are some distance from the end of the part. By way of example, a simple boom with some bottom spring support is required to install and remove the rotation preform. Previous methods would require complicated expanding/contracting mechanisms which are costly.

Certain modifications and additions to the present invention have been deleted herein for the sake of conciseness and readability but are fully intended to fall within the scope of the following claims. As an example, additional metallurgical protection could be gained by inert gas shielding either through the preform itself or an auxiliary shield mounted to the support for the preform.

What is claimed is:

1. A method of groove weld joining two pipe segments comprising the steps of:

preparing the joining ends of each pipe segment;

placing the joining ends of each pipe segment on a ceramic rotating preform;

providing an inert gas for shielding the welding process; forming a weld bead in the joining ends of the pipe segment; and flowing the weld bead into the ceramic rotating preform to form an underbead on the inside surfaces of the joining ends of the pipe segment.

2. A method as set forth in claim 1 wherein the step of preparing the joining ends of each pipe segment includes the step of forming an angled wedge shape extending from the inside surface to the outside surface of each pipe segment so that the pipe segments join at a point along the inside surfaces and form a gap at the outside surfaces thereof.

3. A method as set forth in claim 2 wherein the step of forming a weld bead includes the step of placing a welding torch inside the gap between pipe segments to melt a weld rod therein forming a molten weld bead within the gap.

4. A method as set forth in claim 3 wherein the ceramic rotating preform has a groove formed therein and the step of flowing the weld bead includes the step of flowing the weld bead from the gap into the groove to form the underbead according to the shape of the groove.

5. A method as set forth in claim 4 wherein the ceramic rotating preform has cooling fluid flowing therein to help cool the underbead.

6. Apparatus for welding pipe segments comprising:

a ceramic rotating preform having a circumferential groove therein;

support means for placing pipe segments on said ceramic rotating preform to allow the joining ends of the pipe sections to be located on the groove of said ceramic rotating preform;

welding means for forming an underbead in the groove of said ceramic rotating preform to weld the inside surfaces of the pipe sections together; and means for providing an inert gas for shielding the welding process.

7. Apparatus as set forth in claim 6 wherein said welding means includes a welding torch intended for insertion into an angled gap preformed in the joining ends of the pipe sections to allow the groove welding of the pipe sections along the gap.

8. Apparatus as set forth in claim 7 including cooling means for cooling said ceramic rotating preform.

* * * * *